United States Patent
O'Flinn et al.

(10) Patent No.: US 8,392,309 B2
(45) Date of Patent: Mar. 5, 2013

(54) EQUITY-INDEXED ANNUITY FOR GROUP SAVINGS PROGRAMS

(76) Inventors: Christopher W. O'Flinn, Potomac, MD (US); Felix Schirripa, Colts Neck, NJ (US)

(*) Notice: Subject to any disclaimer, the term of this patent is extended or adjusted under 35 U.S.C. 154(b) by 6 days.

(21) Appl. No.: 12/901,174

(22) Filed: Oct. 8, 2010

(65) Prior Publication Data

US 2011/0060698 A1 Mar. 10, 2011

Related U.S. Application Data

(63) Continuation of application No. 11/455,785, filed on Jun. 20, 2006, now Pat. No. 7,813,985.

(60) Provisional application No. 60/708,369, filed on Aug. 16, 2005.

(51) Int. Cl.
 *G06Q 40/00* (2012.01)
(52) U.S. Cl. .................................. 705/36 R; 705/35
(58) Field of Classification Search .................. None
 See application file for complete search history.

(56) References Cited

U.S. PATENT DOCUMENTS

| | | | | |
|---|---|---|---|---|
| 6,049,772 | A * | 4/2000 | Payne et al. | 705/4 |
| 6,636,834 | B1 * | 10/2003 | Schirripa | 705/36 R |
| 7,376,609 | B2 * | 5/2008 | Clark et al. | 705/36 R |
| 7,433,839 | B2 | 10/2008 | Bodurtha et al. | |
| 7,467,112 | B2 | 12/2008 | Frankel | |
| 7,502,755 | B1 | 3/2009 | Brickman et al. | |
| 2002/0059123 | A1 * | 5/2002 | Dunning et al. | 705/35 |
| 2003/0055763 | A1 * | 3/2003 | Linnenbringer et al. | 705/36 |
| 2007/0033124 | A1 * | 2/2007 | Herr et al. | 705/35 |

OTHER PUBLICATIONS

Carletti, Mitzi, and Eric J. Weigel. "The Bond/Call Option Strategy." Journal of Portfolio Management, Fall 1992, 19(1 ): 8-pgs.*
Taking aim at a moving target Ron Panko. Best's Review. (Life/health insurance edition). Oldwick: Aug 1999. vol. 100, Iss. 4; 5-pgs.*
Safety Cushion: An equity-indexed annuity can offer clients a share of the market's gains while protecting against a loss. DeFrancesco, Roccy, Financial Planning, ITEM04121019, May 1, 2004, 4-pgs.*
The Advantages and Disadvantages of Equity Index Annuities X Geoffrey VanderPal, Journal of Financial Planning; Jan. 2004; 17, 1; 6-pgs.*
http://web.archive.org/web/20050308202431/http://www.ins.state.il.us/Life_Annuities/equ "Buyer's Guide to Equity-Indexed Annuities"; Prep by the Nat Assn of Ins Com, Feb. 22, 2005.
"Improvements On the Equity Indexed Annuity Market" A Diss Pres in Part Fulfillment of the Req for the Degree Dr of Phil in the Grad Sch of Ohio State Univ by V. Sachelarie.
http://www.sec.gov/investor/pubs/equityidxannuity.htm; "Equity-Indexed Annuities"; U.S. Securities and Exchange Commission; dated Aug. 30, 2005; pp. 1-4.
http://www.nasd.com/InvestorInformation/Invester Alerts/Printer-Friendly/NASDW_0135 . . . "Equity-Indexed Annuities-A Complex Choice"; Updated: Jun. 30, 2005; pp. 1-4.

* cited by examiner

*Primary Examiner* — Gregory Johnson
(74) *Attorney, Agent, or Firm* — Bingham McCutchen LLP

(57) ABSTRACT

A Group Equity-Indexed Annuity (GEIA) with a guaranteed minimum equity related return for a set of individuals are provided. An algorithm sets a "participation rate" of a GEIA contract as well as the carrier margin, risk and opportunity for recovery. The carrier is held accountable to the participation rate produced by the model investment portfolio in the formula and subject to the guaranteed minimum. The selection of the participation rate is entirely visible to a GEIA contractholder. A "hedge budget" is based on a formula-driven amortization process that blends old and new money. Underlying assets are also managed to a "constant" duration, such as the duration of a bond index selected by the GEIA contractholder.

22 Claims, 10 Drawing Sheets

Assumptions for Cash Flow Development

| | |
|---|---|
| Contribution at t=0 | $100 |
| Ct growth rate | 0% |
| Free withdrawals | 5% (mid-year) |
| Charged withdrawals | 2% (mid-year) |
| Withdrawal charge | 8% (mid-year) |

| Year Beginning | t | All Participants - Basic Cash Flows | | | | All Participants - Total EIA Account Information | | | | | |
|---|---|---|---|---|---|---|---|---|---|---|---|
| | | C | fW | cW | wC | AVt (prelim) | AVt (post-Ws) | Pr(1) | S&Pr (full yr) | AVt (post return)(2) | AVt ("return") |
| 1985 | 0 | $100 | $ 5.00 | $ 2.00 | $ 0.16 | $ 100.00 | $ 92.84 | 80% | 26.33% | $ 112.40 | 21.07% |
| 1986 | 1 | $100 | $ 10.62 | $ 4.25 | $ 0.34 | $ 212.40 | $ 197.19 | 80% | 14.62% | $ 220.25 | 11.70% |
| 1987 | 2 | $100 | $ 16.01 | $ 6.41 | $ 0.51 | $ 320.25 | $ 297.32 | 80% | 2.03% | $ 302.15 | 1.62% |
| 1988 | 3 | $100 | $ 20.11 | $ 8.04 | $ 0.64 | $ 402.15 | $ 373.35 | 55% | 12.40% | $ 398.81 | 6.82% |
| 1989 | 4 | $100 | $ 24.94 | $ 9.98 | $ 0.80 | $ 498.81 | $ 463.10 | 77% | 27.25% | $ 559.80 | 20.88% |
| 1990 | 5 | $100 | $ 32.99 | $ 13.20 | $ 1.06 | $ 659.80 | $ 612.56 | 80% | -6.56% | $ 612.56 | 0.00% |
| 1991 | 6 | $100 | $ 35.63 | $ 14.25 | $ 1.14 | $ 712.56 | $ 661.54 | 80% | 26.31% | $ 800.76 | 21.05% |
| 1992 | 7 | $100 | $ 45.04 | $ 18.02 | $ 1.44 | $ 900.76 | $ 836.27 | 80% | 4.46% | $ 866.13 | 3.57% |
| 1993 | 8 | $100 | $ 48.31 | $ 19.32 | $ 1.55 | $ 966.13 | $ 896.96 | 80% | 7.05% | $ 947.58 | 5.64% |
| 1994 | 9 | $100 | $ 52.38 | $ 20.95 | $ 1.68 | $ 1,047.58 | $ 972.58 | 80% | -1.54% | $ 972.58 | 0.00% |
| 1995 | 10 | $100 | $ 53.63 | $ 21.45 | $ 1.72 | $ 1,072.58 | $ 995.78 | 80% | 34.11% | $ 1,267.51 | 27.29% |
| 1996 | 11 | $100 | $ 68.38 | $ 27.35 | $ 2.19 | $ 1,367.51 | $ 1,269.60 | 80% | 20.26% | $ 1,475.41 | 16.21% |
| 1997 | 12 | $100 | $ 78.77 | $ 31.51 | $ 2.52 | $ 1,575.41 | $ 1,462.61 | 80% | 31.01% | $ 1,825.44 | 24.81% |
| 1998 | 13 | $100 | $ 96.27 | $ 38.51 | $ 3.08 | $ 1,925.44 | $ 1,787.58 | 75% | 26.67% | $ 2,142.75 | 19.87% |
| 1999 | 14 | $100 | $ 112.14 | $ 44.85 | $ 3.59 | $ 2,242.75 | $ 2,082.17 | 66% | 19.53% | $ 2,348.56 | 12.79% |
| 2000 | 15 | $100 | $ 122.43 | $ 48.97 | $ 3.92 | $ 2,448.56 | $ 2,273.24 | 70% | -10.14% | $ 2,273.24 | 0.00% |
| 2001 | 16 | $100 | $ 118.66 | $ 47.46 | $ 3.80 | $ 2,373.24 | $ 2,203.32 | 55% | -13.04% | $ 2,203.32 | 0.00% |
| 2002 | 17 | $100 | $ 115.17 | $ 46.07 | $ 3.69 | $ 2,303.32 | $ 2,138.40 | 64% | -23.37% | $ 2,138.40 | 0.00% |
| 2003 | 18 | $100 | $ 111.92 | $ 44.77 | $ 3.58 | $ 2,238.40 | $ 2,078.13 | 55% | 26.38% | $ 2,379.83 | 14.52% |
| 2004 | 19 | $100 | $ 123.99 | $ 49.60 | $ 3.97 | $ 2,479.83 | $ 2,302.28 | 76% | 8.99% | $ 2,460.52 | 6.87% |
| 2005 | 20 | $100 | $ 128.03 | $ 51.21 | $ 4.10 | $ 2,560.52 | $ 2,377.19 | 80% | | | |

(1) See "Pr Calculation" worksheet
(2) Assumes bonus interest is not credited (solely to simplify illustration)
Total account value for the January EIA account, as reported to participants (and guaranteed by insurer)

Fig. 7A

Contract fees, and development of participation rates

Participation Rates (Subsidy & Constraints)

| | | | | | | | | | | | minimum | 35% |
| | | | | | | | | | | | maximum | 80% |

| Time | Insurer fee(1) | Interest reset margin(2) | O cost(3) (per unit) | Smoothed Interest I (4&5) | Interest/UAV Buy O (BoY) J | Pr(prelim) | Pr(constrained) | Subsidy | Cumulative Subsidy | Available for Repayment | Subsidy Repaid |
|---|---|---|---|---|---|---|---|---|---|---|---|
| 0  | 0.50% | 0.50% | 9.00%  | 11.19% | 0.1006 | 112% | 80% | $ - | $ - | $ -     | $ - |
| 1  | 0.50% | 0.50% | 7.52%  | 10.36% | 0.0938 | 125% | 80% | $ - | $ - | $ 8.43  | $ - |
| 2  | 0.50% | 0.50% | 8.54%  | 9.17%  | 0.0840 | 98%  | 80% | $ - | $ - | $ 11.31 | $ - |
| 3  | 0.50% | 0.50% | 15.41% | 9.28%  | 0.0847 | 55%  | 55% | $ - | $ - | $ 5.42  | $ - |
| 4  | 0.50% | 0.50% | 11.27% | 9.45%  | 0.0864 | 77%  | 77% | $ - | $ - | $ 14.46 | $ - |
| 5  | 0.50% | 0.50% | 8.39%  | 9.37%  | 0.0857 | 102% | 80% | $ - | $ - | $ 28.69 | $ - |
| 6  | 0.50% | 0.50% | 9.65%  | 9.20%  | 0.0842 | 87%  | 80% | $ - | $ - | $ 29.06 | $ - |
| 7  | 0.50% | 0.50% | 7.76%  | 9.23%  | 0.0845 | 109% | 80% | $ - | $ - | $ 44.42 | $ - |
| 8  | 0.50% | 0.50% | 6.19%  | 8.76%  | 0.0805 | 130% | 80% | $ - | $ - | $ 68.95 | $ - |
| 9  | 0.50% | 0.50% | 5.44%  | 8.80%  | 0.0808 | 149% | 80% | $ - | $ - | $ 88.82 | $ - |
| 10 | 0.50% | 0.50% | 7.25%  | 9.24%  | 0.0845 | 117% | 80% | $ - | $ - | $ 72.24 | $ - |
| 11 | 0.50% | 0.50% | 6.29%  | 8.98%  | 0.0824 | 131% | 80% | $ - | $ - | $ 84.86 | $ - |
| 12 | 0.50% | 0.50% | 7.84%  | 9.28%  | 0.0849 | 108% | 80% | $ - | $ - | $ 85.12 | $ - |
| 13 | 0.50% | 0.50% | 10.66% | 8.62%  | 0.0794 | 75%  | 75% | $ - | $ - | $ 49.41 | $ - |
| 14 | 0.50% | 0.50% | 11.17% | 7.89%  | 0.0732 | 66%  | 66% | $ - | $ - | $ 43.00 | $ - |
| 15 | 0.50% | 0.50% | 10.85% | 8.20%  | 0.0758 | 70%  | 70% | $ - | $ - | $ 59.18 | $ - |
| 16 | 0.50% | 0.50% | 12.31% | 7.24%  | 0.0676 | 55%  | 55% | $ - | $ - | $ 32.87 | $ - |
| 17 | 0.50% | 0.50% | 10.84% | 7.49%  | 0.0696 | 64%  | 64% | $ - | $ - | $ 48.39 | $ - |
| 18 | 0.50% | 0.50% | 11.59% | 6.81%  | 0.0638 | 55%  | 55% | $ - | $ - | $ 29.42 | $ - |
| 19 | 0.50% | 0.50% | 8.47%  | 6.92%  | 0.0647 | 76%  | 76% | $ - | $ - | $ 60.01 | $ - |
| 20 | 0.50% | 0.50% | 6.51%  | 8.60%  | 0.0619 | 95%  | 80% | $ - | $ - | $ 92.15 | $ - |

(1) Hypothetical fee of 50 basis points, for illustrative purposes only
(2) Hypothetical margin to adjust the ytm of the bond index for the risk of asset defaults and calls
(3) Based on Black-Scholes model, and assuming "x" factor is zero; calculation not shown.
(4) Per algorithm, available interest is developed using a "blended" old and new money rate (net of all fees, and reset margins)
(5) Bond index is assumed to have a duration of six at all times

Fig. 7B

Basic Information for Development of Participation Rates

| Time | A' (pre-Ospend) (Post Payoff) | Ospend | A (post-Ospend) | A(post-Os) at year end | Insurer fees(5) | Participant Withdrawals | Participant Wx adj total r | A (post- O, f, W) at year end | A total return (1) | Payoff BoY (2) | A ytm (3) |
|---|---|---|---|---|---|---|---|---|---|---|---|
| 0 | $100.00 | $7.20 | $92.80 | $115.13 | $0.60 | $7.00 | $7.80 | $106.73 | 24.06% | $ - | 12.19% |
| 1 | $227.80 | 12.78 | $215.02 | $250.54 | 1.29 | 14.87 | 16.05 | $233.20 | 16.52% | $21.07 | 10.08% |
| 2 | $358.05 | 21.89 | $336.16 | $344.76 | 1.78 | 22.42 | 22.70 | $320.28 | 2.56% | $24.84 | 8.16% |
| 3 | $425.47 | 34.07 | $391.40 | $427.53 | 2.23 | 28.15 | 29.42 | $395.88 | 9.23% | $5.19 | 9.24% |
| 4 | $523.30 | 43.07 | $480.22 | $547.94 | 2.86 | 34.92 | 37.30 | $507.78 | 14.10% | $27.42 | 9.58% |
| 5 | $711.94 | 44.26 | $667.68 | $714.81 | 3.69 | 46.19 | 47.79 | $663.33 | 7.06% | $104.16 | 8.99% |
| 6 | $763.33 | 55.01 | $708.32 | $839.50 | 4.36 | 49.88 | 54.30 | $780.84 | 18.52% | $0.00 | 8.95% |
| 7 | $1,030.80 | 55.93 | $974.87 | $1,059.58 | 5.45 | 63.05 | 65.74 | $988.40 | 8.69% | $149.96 | 7.80% |
| 8 | $1,120.57 | 47.87 | $1,072.70 | $1,203.25 | 6.15 | 67.63 | 71.63 | $1,125.47 | 12.17% | $32.17 | 7.10% |
| 9 | $1,280.00 | 45.56 | $1,234.43 | $1,186.04 | 6.04 | 73.33 | 71.88 | $1,108.12 | -3.92% | $54.53 | 6.22% |
| 10 | $1,208.12 | 62.24 | $1,145.88 | $1,400.73 | 7.21 | 75.08 | 83.01 | $1,310.50 | 22.24% | $0.00 | 8.09% |
| 11 | $1,703.19 | 68.80 | $1,634.39 | $1,688.00 | 8.62 | 95.73 | 97.28 | $1,582.10 | 3.28% | $292.69 | 6.06% |
| 12 | $1,903.79 | 98.76 | $1,805.02 | $1,989.68 | 10.22 | 110.28 | 115.78 | $1,863.68 | 10.23% | $221.69 | 6.88% |
| 13 | $2,354.48 | 152.87 | $2,201.61 | $2,390.73 | 12.36 | 134.78 | 140.45 | $2,237.92 | 8.59% | $390.81 | 6.04% |
| 14 | $2,720.48 | 164.08 | $2,556.40 | $2,506.80 | 12.94 | 156.99 | 155.46 | $2,338.40 | -1.94% | $382.56 | 5.48% |
| 15 | $2,725.34 | 185.54 | $2,539.80 | $2,778.54 | 14.39 | 171.40 | 179.27 | $2,584.87 | 9.40% | $286.94 | 7.28% |
| 16 | $2,684.87 | 160.32 | $2,524.55 | $2,787.17 | 14.37 | 166.13 | 174.55 | $2,598.25 | 10.40% | $0.00 | 6.06% |
| 17 | $2,698.25 | 160.42 | $2,537.83 | $2,804.86 | 14.46 | 161.23 | 169.50 | $2,620.89 | 10.52% | $0.00 | 5.69% |
| 18 | $2,720.89 | 142.72 | $2,578.17 | $2,776.50 | 14.26 | 156.69 | 162.60 | $2,599.63 | 7.69% | $0.00 | 4.39% |
| 19 | $3,024.60 | 160.47 | $2,864.13 | $3,014.42 | 15.49 | 173.59 | 178.08 | $2,820.84 | 5.25% | $324.97 | 4.44% |
| 20 | $3,091.30 | 133.39 | $2,957.91 | $2,957.91 | 15.12 | 179.24 | 179.24 | $2,763.55 | | $170.45 | 4.30% |

(1) Bond index total gross return for the year (from Lehman)
(2) Payoff from purchase of call options at beginning of new year (calculated per algorithm)
(3) The bond index gross yield-to-maturity (from Lehman)

Fig. 7C

| Time | Group Contract Financial Position January EIA Account Only MV less AV (1) | Group Contract Financial Position January EIA Account Only Gain/AV | Liquidation Values (BoY) January EIA Account Only AV | Liquidation Values (BoY) January EIA Account Only MV |
|---|---|---|---|---|
| 0 | $  -        | 0.00%  | $    100.00 | $    100.00 |
| 1 | $  15.40    | 7.25%  | $    212.40 | $    227.80 |
| 2 | $  37.79    | 11.80% | $    320.25 | $    358.05 |
| 3 | $  23.33    | 5.80%  | $    402.15 | $    425.47 |
| 4 | $  24.49    | 4.91%  | $    498.81 | $    523.30 |
| 5 | $  52.14    | 7.90%  | $    659.80 | $    711.94 |
| 6 | $  50.78    | 7.13%  | $    712.56 | $    763.33 |
| 7 | $  130.04   | 14.44% | $    900.76 | $  1,030.80 |
| 8 | $  154.43   | 15.98% | $    966.13 | $  1,120.57 |
| 9 | $  232.41   | 22.19% | $  1,047.58 | $  1,280.00 |
| 10 | $  135.54  | 12.64% | $  1,072.58 | $  1,208.12 |
| 11 | $  335.68  | 24.55% | $  1,367.51 | $  1,703.19 |
| 12 | $  328.37  | 20.84% | $  1,575.41 | $  1,903.79 |
| 13 | $  429.04  | 22.28% | $  1,925.44 | $  2,354.48 |
| 14 | $  477.73  | 21.30% | $  2,242.75 | $  2,720.48 |
| 15 | $  276.78  | 11.30% | $  2,448.56 | $  2,725.34 |
| 16 | $  311.63  | 13.13% | $  2,373.24 | $  2,684.87 |
| 17 | $  394.93  | 17.15% | $  2,303.32 | $  2,698.25 |
| 18 | $  482.49  | 21.56% | $  2,238.40 | $  2,720.89 |
| 19 | $  544.77  | 21.97% | $  2,479.83 | $  3,024.60 |
| 20 | $  530.77  | 20.73% | $  2,560.52 | $  3,091.30 |

(1) Calculated market value of cash flows to/from separate account less total participant account values (at beginning of year, after payoff)

Fig. 7D

EQUITY-INDEXED ANNUITY FOR GROUP SAVINGS PROGRAMS

CROSS REFERENCE TO RELATED APPLICATIONS

This application is a continuation of U.S. patent application Ser. No. 11/455,785 filed on Jun. 20, 2006 now U.S. Pat No. 7,813,985, which claims priority to U.S. patent application Ser. No. 60/708,369 filed on Aug. 16, 2005.

BACKGROUND OF THE INVENTION

1. Field of the Invention

The present invention relates to a design, computer implemented method, a computer-based system, and computer program product for the design and operation of an investment contract or an insured annuity contract that credits interest on principal in a manner relating to equity returns while offering protection of principal. More particularly, the present invention relates to a computer implemented method, computer-based system, and computer program product for creating and implementing a Group Equity-Indexed Annuity (GEIA) with a guaranteed minimum equity related return for a set of participants in 401(k) plans and other tax qualified and non-qualified group savings arrangements.

2. Description of the Prior Art

Various types of investment vehicles are available to individuals including, but not limited to, stocks, bonds, real estate, commodities, annuities and mutual funds. Each of these investment vehicles yields the investor a given combination rate of return and level of risk. While young investors can tolerate a higher level of risk in their retirement savings accounts since they have many years to recover from losses, retired individuals and individuals near retirement have a lower risk tolerance. This is because principal on which they are relying to recover from an investment loss is being constantly depleted for living expenses. The future income plans of individuals in or near retirement can be critically disrupted by even modest investment losses. Accordingly, retirees and individuals near retirement need to minimize or avoid investment losses.

A type of fixed annuity contract currently available to individuals, called an Equity-Indexed Annuity (annual ratchet type), addresses this problem. The individual EIA contract provides a guarantee of principal plus interest, at least equal to the requirements imposed by the state insurance Standard Non-Forfeiture Law, while also promising alternative interest credits equal to a percentage of the increase (i.e., positive change) in a standard equity index, like the S&P 500 without dividends (S&P). As a result, an individual annual ratchet type EIA contract delivers equity related returns while offering protection of principal and guaranteed interest. Very high loads and carrier discretion over benefits (i.e., interest crediting) currently characterize the individual EIA contracts available in the retail marketplace.

The individual EIAs that exist in the retail market (e.g., those sold to individuals by agents and brokers) are designed with various features. The impact that these features have on interest credits, minimum guarantees, loads, and liquidity (i.e., the ability to make penalty-free withdrawals) will ultimately drive customer satisfaction or dissatisfaction. Aside from the minimum interest guarantees, surrender charges, and loads, the two features that have a large value impact are the "participation rate" and the "indexing method". Indexing methods vary from product to product. Three are in common use, including the annual resets (ratchets), the point-to-point, and the high-water mark. In most cases, equity-linked interest is credited, over a pre-defined term, using one of these methods.

Participation Rates

The participation rate determines how much of the index increase will be credited. For example, a 50% participation rate means the individual will receive ½ the increase in the equity index during the measurement period credited as interest. In the annual ratchet design, this equity related interest would be credited every year. In the point-to-point design the interest crediting is calculated using the change from point A (contract issue) to point B (say, 7 years after issue). The participation rate is reset annually in the annual ratchet EIA design. For the point-to-point design, the participation rate is set for the point-to-point period. At the end of the period (annually for the annual ratchet deign), the participation rate may change. How participation rates change is not always disclosed in the retail (i.e., individual) market. There are several possible reasons for this. First, the reset process is complex—both to explain and understand. Second, a full explanation requires complete disclosure of fees and margins. Third, some carriers want to retain flexibility to increase fees and margins in the future, without the problems that may come with communication of the fee increase. In the retail market, absent more restrictive regulatory controls, the reset process is likely to remain in the proverbial "black box."

Interest Credits May be Limited

Some retail EIA designs place limits on the interest credited. For example, if the participation rate is 75% and the equity index, for example, the S&P, delivers a 40% return over the measuring term, the calculated participation rate would be 30% but the contract may limit the interest credited to, say, 10%. These limits are called "rate caps" or simply "caps." As another example, the contract may credit 100% of the increase in the index, but cap the interest credit to, say, 10%. With some EIA designs, the change in the index may be measured by using an average of the index values, instead of the index value on a particular day. Some contracts credit interest using a "simple interest" basis instead of compound interest. With simple interest, only the original contribution grows with interest. In other words, interest credits do not grow with interest. Each of these design features play a key role in how the contract will perform relative to the buyer's expectation. For example, buying the point-to-point design at the start of a bull market may create dissatisfaction if the reset "point" comes in the middle of a bear market. If the individual tries to withdraw contributions invested before the end of some "holding period" (e.g., essentially a "maturity" date), surrender charges make it economically painful.

Early Withdrawals are Charged Exit Fees

Surrender charges vary from EIA contract to EIA contract. However, most EIA contracts are designed to provide "free" access for small withdrawal requests, such as up to 10% per year, and "free" access for death. In general, the charges for other premature withdrawals can be quite high, in some cases in excess of 10%. These charges, of course, accrue to the benefit of the carrier. Some EIA contracts are also designed to provide access using an "imputed" market value calculation. This calculation, while intended to be fair, could be confusing and difficult for individual buyers to understand and also exposes the individual to significant economic loss.

Early withdrawals may also cost the carrier because sales expenses, amortized over a period of, say, five to ten years, must be recovered from the amount withdrawn. Otherwise the carrier could realize a loss. However, insurance laws provide protection for the consumer. By law, carriers are required to pay minimum surrender values, and thus, collect no more than some pre-specified maximum surrender charges. The minimum surrender values required by the Standard Non-forfeiture Law (SNFL) are meaningful, but still unattractive to many consumers. In a typical case, for example, the law requires a guarantee that each $100 contributed (i.e., invested) can be surrendered at a value equal to $87.50 plus interest at 2.85% per year. Even with these relatively low surrender values, the carrier is still at risk of not fully recovering its contract acquisition expenses.

Carrier's Asset Strategy for the Retail EIA

In implementing an EIA contract, the carrier invests the premium in bonds and a portion of the anticipated interest on those bonds is advanced and used to buy one-year call options on the measuring equity index, say the S&P. If the interest that can be advanced from the bonds is 4.00%, the contract's participation rate is dependent on how many call options the carrier can buy with the $4 of interest (per $100 of premium). If the price of the call option is $5 per $100 of S&P value, the participation rate is 80%. At the end of the year, the call option will expire worthless if the index is down. But, if the index is up, the call option will provide the "payoff" needed to credit the proper interest. In either case, the carrier will have sufficient assets to pay the customer what was promised. This asset/liability management process is repeated each year for the term (or holding period) of the contract (at which point the surrender charges no longer apply).

The participation rate for the EIA is, in effect, a hedge ratio. The participation rate depends on the amount of money spent by the carrier (4% in our example) and the price of the call options. If call options cost $8 per $100, then the carrier can "hedge" 50% and pay the customer 50% (participation rate) of the positive change in the equity index. The amount of money used to buy options ($4) is a function of the interest available on the bonds purchased. The carrier wants their bond portfolio to return the original $100 in a year's time. Therefore, if bonds deliver an annual yield of 4.16%, the carrier could, at the beginning of the year, afford to "advance" (i.e., spend) one year's interest toward the purchase of call options. The interest advanced ($4) merely represents the discounted, or current, value of the interest it expects to receive on the bonds at the end of the year. This "advanced" interest is commonly thought of as "interest available". The insurance company has no control over option prices. If option prices increase, but bonds were locked into a yield of 4.16%, then the participation rate will fall.

Accordingly, there is a need for a method, system and computer program product for minimizing the undesirable aspects of an EIA contract—the undisclosed process for resetting participation rates, high surrender charges, and very restrictive liquidity. There is a need for the EIA contract to be for a set of participants and guarantee a minimum participation rate, while also offering a reasonable profit margin to the carrier. There is a need for the method, system and computer program product to minimize downside risk with respect to the purchase of EIAs to be available to a plurality of individuals. There is a need for the plurality of individuals to be participants of a group sponsored savings program (either tax qualified or non-qualified). There is a need for the method, system and computer program product for minimizing downside risk with respect to the purchase of EIAs to carry low loads. There is a need to guarantee a minimum participation rate (i.e., a guaranteed minimum percentage of the increase in a standard equity index). There is a need for the participation rate to be based entirely on a formula that removes carrier discretion. There is a need for the formula to take advantage of the unique economic benefits available to individuals (e.g., participants in savings programs) by pooling their collective contributions (both from previous years and the current year).

SUMMARY OF THE INVENTION

According to the present invention a computer implemented method, computer-based system, and computer program product for implementing a Group Equity-Indexed Annuity (GEIA) with a guaranteed minimum participation rate for a plurality of participants are provided. The GEIA contract takes advantage of the unique aspects of an employer sponsored qualified savings plan (or other "group" savings arrangement) to deliver a low load valuable benefit, while offering the carrier a reasonable profit margin. The GEIA contract requires the carrier to guarantee minimum participation rates. If necessary, the carrier would advance the cost of call options needed to bring the participation rate to the minimum level when formula calculated participation rate is below the guaranteed minimum level. The money advanced by the carrier is repaid over time to the carrier, again through a formula used to operate the GEIA contract and which is one of the key elements of the innovation of the present invention. Indeed, the new process (and formula) regulates the level of participation rates within a given range. For example, the participation rate must always stay in the range of 35% to 80%.

In an embodiment of the present invention, the GEIA contract of the present invention employs a formula to set the key benefit provisions of the GEIA contract as well as the carrier fee. This formula and the concepts it implements are the essence of the innovations that create new value for a plurality of participants. The formula drives the participation rate, the available interest, and the fee collected by the carrier. The carrier has no discretion in any part of the calculation of the participation rate because the participation rate is set by formula with values derived from outside references for such items as the cost of call options, the performance of the bonds purchased, the yield on those bonds, and the return of the equity index. Regardless of the carrier's actual costs for call options or the actual performance of the bonds purchased, the carrier must honor the participation rate produced by the formula (which is further constrained by minimum guarantees). As a result, the selection (indeed, calculation) of the participation rate is entirely visible to the group contract-holder. To take advantage of the "group" aspects, the "available interest" or "hedge budget" uses a formula-driven amortization process that blends old and new money. Also, while the carrier may invest cash flows at their discretion, the carrier must, in effect, guarantee to pass-thru the returns of the outside reference bond index by using the outside reference bond index values for such items as market value, yield and duration, as required in the formula. As envisioned, the GIEA contract allows the sponsor of the group savings arrangement to select the bond index used by the carrier (so long as the carrier agrees and the outside reference values required by the formula are available). The carrier's fee is built into the formula and provides a reasonable fee for the risks inherent in the GEIA contract. By its design, the carrier is relying on the opportunity to receive continuous cash flow from a plurality of participants. This stream of potential future contributions reduces the risk for the carrier.

In an embodiment of the present invention, the GEIA contract also offers benefits that include a) the ability of the group contract-holder (e.g., the savings plan sponsor) to cancel the GEIA contract at a value that is derived by formula and fair to all parties, including the carrier, the contract holder, and the participants; b) portability of benefits; c) insulated separate account; and d) improved liquidity. The portability feature offers participants the ability to preserve the GEIA guarantees on prior contributions to the contract without being forced to continue to participate in the savings plan. The insulated separate account contract structure adds a layer of security in the unlikely event the carrier experiences financial problems. Based on insurance laws, the assets in the insulated separate account are not available to meet the obligations of the carrier's general account. Liquidity includes the right to transfer funds out of the GEIA to other investment options in the employer sponsored savings program and to withdraw from the GEIA.

BRIEF DESCRIPTION OF THE DRAWINGS

The above described features and advantages of the present invention will be more fully appreciated with reference to the detailed description and appended figures in which:

FIGS. 7A-7D depict results that the algorithm would have produced using historical information for a Group EIA contract started in 1985.

GLOSSARY OF TERMS

Figure 1:
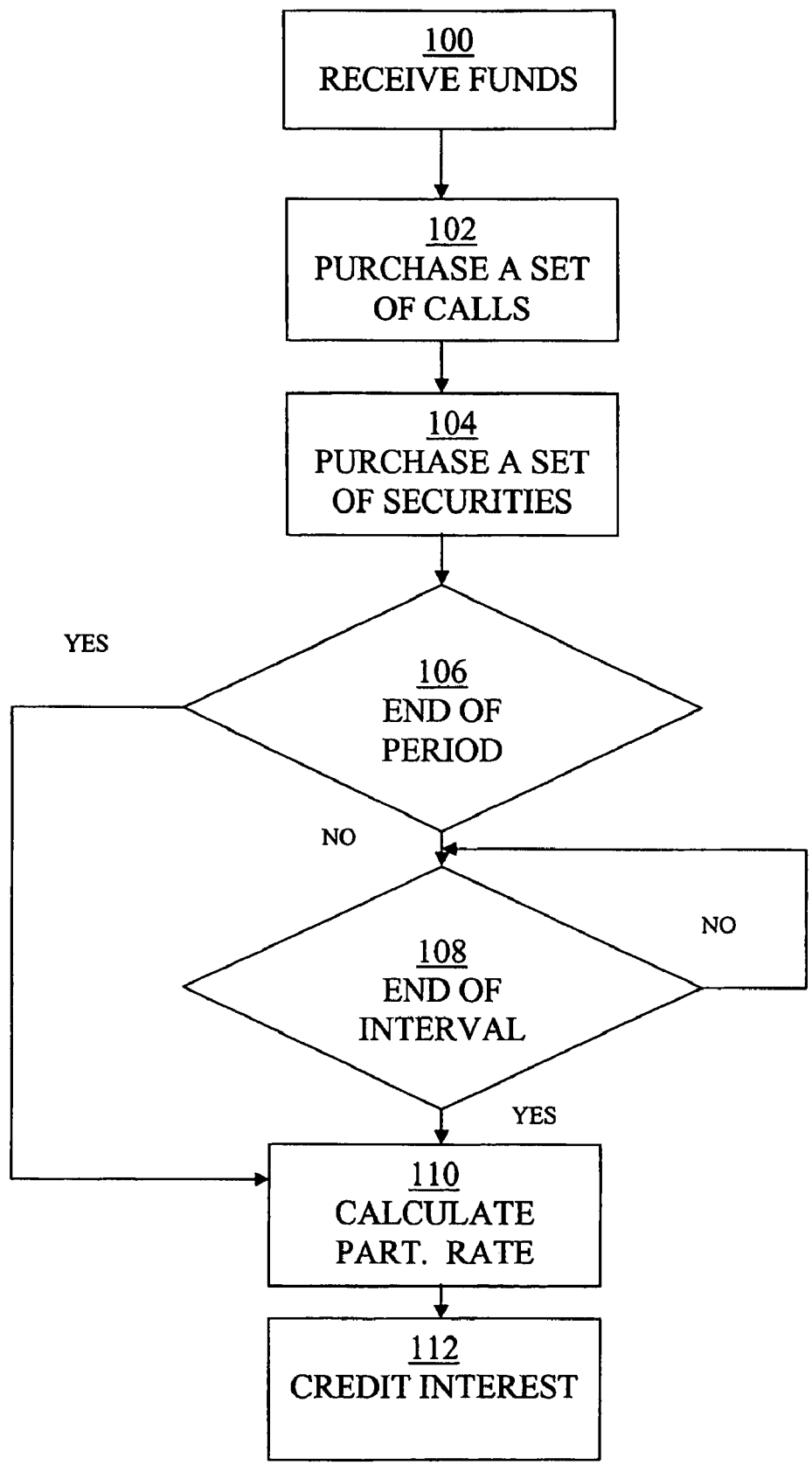
FIG. 1 depicts an exemplary flow chart of a method of implementing a Group Equity-Indexed Annuity with a guarantee minimum participation rate according to an embodiment of the present invention.

Carrier: In the context of the present invention, a carrier is an insurance company that implements a Group Equity-Indexed Annuity (GEIA) with a guaranteed minimum participation rate for a plurality of participants.

Participant: In the context of the present invention, a participant is an individual in a set (or plurality) of individuals who has the option to make contributions to a Group Equity-Indexed Annuity (GEIA) with a guaranteed minimum participation rate.

Hedge Budget: In the context of the present invention, a hedge budget is the amount of money advanced by the carrier, based on calculated interest earnings expected from the cash flows to/from the GEIA, for the purchase of one-year call options on the S&P index.

Interest: In the context of the present invention, interest is the calculated return credited to participant account balances.

Call: In the context of the present invention, a call is the option to buy a given security at a given price before a given date.

Old Money: In the context of the present invention, old money is the contributions deposited to an GEIA cell in previous periods including interest credited.

New Money: In the context of the present invention, new money is the contributions now being deposited to the GEIA cell in a current period including interest now being credited.

Blend: In the context of the present invention, a blend is the hedge budget derived from old money appropriately mixed with new money using the group EIA algorithm.

Participation Rate: In the context of the present invention, a participation rate is a percentage calculated by formula that determines how much of the equity index is credited to the GEIA account balance as interest.

Indexing Method: In the context of the present invention, an indexing method is a method used to allocate a benefit over a pre-determined period of time.

Participant Account Value: In the context of the present invention, the participant account value is the sum of the contributions plus Interest minus withdrawals minus withdrawal charges.

Group Contract Account Value: In the context of the present invention, the Group Contract Account Value is the total of all Participant Account Values.

DETAILED DESCRIPTION OF THE INVENTION

The present invention is now described more fully hereinafter with reference to the accompanying drawings that show embodiments of the present invention. The present invention, however, may be embodied in many different forms and should not be construed as limited to embodiments set forth herein. Appropriately, these embodiments are provided so that this disclosure will be thorough and complete, and will fully convey the scope of the present invention.

According to the present invention a computer implemented method, computer-based system, and computer program product for implementing a GEIA with a guaranteed minimum participation rate for a set of participants are provided. An algorithm sets a "participation rate" of a GEIA contract as well as the carrier fee. The carrier is held accountable to the participation rate produced by the bond index (which is used as a proxy for the carrier's investment performance attributable to the GEIA cash flows) in the formula, and subject to the guaranteed minimum participation rate. The calculation of the participation rate is entirely visible to an GEIA group contract-holder. The "hedge budget" is based on a formula-driven amortization process that blends interest available on old and new money from participants. The blending process used in the formula converts realized and unrealized gains and losses from the bond index into annual interest rates over the duration of that bond index (i.e., the carrier's theoretical bond portfolio). These interest rates are then used to calculate the amount of the hedge budget. And, the carrier has no discretion to change the calculated hedge budget. One having ordinary skill in the art would recognize that there are many methods of "blending" the interest available on old and new money from participants. In addition, while our approach assumes the carrier has "no discretion", those having ordinary skill in the art would recognize that it is beneficial to permit some level of discretion.

The GEIA guarantees are portable. Terminating participants are not forced to leave the contributions in the savings program to receive the benefits of the GEIA. The contract assets are held in an insulated separate account. The separate account contract structure adds a layer of security in the unlikely event the carrier experiences financial problems. Participant account values in the GEIA can be transferred out of the contract to other choices in the sponsored savings program. The GEIA withdrawal feature has been designed to accommodate the most common needs of participants (with no charge for certain withdrawals, and only a modest charge for high levels of withdrawals). In an embodiment of the present invention, the GEIA contract includes 12 individual GEIA "cells" also referred to herein as GEIA accounts or GEIA buckets. Each GEIA "cell" or GEIA bucket corresponds to a month in a year in which contributions can be made on a predetermined business day of the month. Within each GEIA bucket for a month, old and new contributions are added to create a single account balance for that GEIA cell (both for each participant and for the total of all participants). A participant's account balance in the GEIA is, therefore, the sum of, up to, 12 individual GEIA "cell" balances. One having ordinary skill in the art would recognize that any number of GEIA cells can be provided in a GEIA contract and is not limited to the embodiment set forth herein. In addition, it is readily apparent that the contract assets need not be held in a separate account.

In an embodiment of the present invention, interest is credited using an annual ratchet design. Compound interest can be paid net, net of all fees and expenses, participation rates can be recalculated annually for each GEIA account (or cell), subject to minimum and maximum constraints, and even "bonus interest" can be paid if available, such as if participation rates reach a pre-defined maximum level. The alternative to paying bonus interest is to simply ignore the "maximum constraint" and pay a higher participation rate. (However, participation rates in excess of 80% would lead to the purchase of, arguably, too many call options that could expire worthless. Crediting a "bonus" rate may be safer for the participants since their contributions are assured some interest, even if the call options purchased to achieve 80% participation rate should expire worthless. This interest crediting strategy reduces the GEIA's downside risk for participants.) Those having ordinary skill in the art would recognize that interest need not be credited using an annual ratchet design.

In an embodiment of the present invention, participation rates vary based on a hedge budget, and the cost of the one-year call options on the equity index. The cost of the call options is calculated using values including, but not limited to, the Black-Scholes option pricing model and external reference values for the one-year risk-free rate, the equity index volatility, and equity index dividend rate. The carrier has no discretion to change the cost of the options. The interest available to buy the call options is derived using "stable value" interest crediting concepts. Each GEIA cell ("GEIA Account") of a GEIA contract operates with its own participation rate. In an embodiment of the present invention, participation rates can be extended to use participation rates based on a "barrier." With participation rates based on barriers, the carrier credits different participation rates at different levels of index performance. For example, 50% on first 10% increase, 60% on next 10% increase, and 70% on equity index increases over 20%. Many other variations are possible, including "averaging", point-to-point, and caps, but the basic algorithm remains unchanged. One having ordinary skill in the art would recognize that the cost of the call options does not need to follow the Black-Scholes option pricing model, nor does it have to be based on the external reference values.

In an embodiment of the present invention, withdrawals are permitted at the beginning of each month, often without charge, but, at times, may be subject to some charge. Full liquidity, at no charge, is available after a number of "anniversaries" have passed (i.e., maturity), such as on the sixth anniversary since deposit. The "Maturity" value can be paid out, or recommitted for another holding period or term (e.g., another six years). Partial liquidity prior to maturity, at no charge for circumstances including, but not limited to, annually up to 10% of prior year's account balance for income purposes, death, and financial hardship (as defined by the group savings program). Surrender charges of 5%, for example, can be applied to withdrawal amounts in excess of "free" withdrawals (subject to SNFL maximum charge—charge is less than 5% only if interest credits are very low for several years). In an embodiment of the present invention, these surrender charges do not accrue to the benefit of the carrier. Instead, the charges are designed solely to discourage participant withdrawals and all collected charges help improve participation rates for the balance of the funds in the GEIA. This is another value-added benefit obtained by operating the GEIA for a plurality of individuals. In an embodiment of the present invention, the cost of the minimum accumulation guarantees provided by the SNFL can be fully absorbed by the insurer, in exchange for a risk charge (in effect, another fee that reduces the blended hedge budget). In an embodiment of the invention, all withdrawals (except "maturity" amounts) can be processed using a "pro-rata by individual" protocol. Alternative withdrawal protocols can also be used, if the proposed protocol is deemed too burdensome for the carrier. One having ordinary skill in the art would recognize that there are many ways to handle and account for withdrawals, withdrawal charges, and contract "maturity".

In an embodiment of the present invention, fees are deducted from the performance of the bond index. The carrier's total fee, includes, but is not limited to, brokerage fees, and can be negotiated and subjected to a "most favored nation" clause. One having ordinary skill in the art would recognize that there are many ways for the carrier to collect its fees.

In an embodiment of the present invention, option costs and payoffs are calculated using external indices and the carrier assumes all option liquidity risk and counter-party risk. In an embodiment of the present invention, the carrier's bonds purchased with the cash flows from the plurality of participants are assumed to track the performance of a bond index, such as Lehman corporate long bond index. The carrier, in effect, guarantees to match the performance of the bond index, and the actual money management performance has no impact on participation rates. In an embodiment of the present invention, the Group EIA contract is portable and provides participants with the option of maintaining deposits in an the contract (without the need to continue participating in the group savings plan), or can issue an individual certificate that preserves the same benefits and guarantees available to the other GEIA participants.

In an embodiment of the present invention, account values are reported to participants. Values reported to participants included, but are not limited to, the ongoing value payable at death, for financial hardship, and "maturity," and the surrender value payable on full withdrawal, such as the ongoing value less applicable surrender charges. The ongoing value can be used to derive the amount of "free" withdrawals. The surrender value is relevant for cash-outs in excess of "free" withdrawals (and transfers out of GEIA to other options in the savings program). In an embodiment of the present invention, values reported to plan sponsors include, but are not limited to, total ongoing values, total surrender values, bond and S&P index values, option prices, available interest, and market value of cash flows based on the bond index values.

In an embodiment of the present invention, 401(k) plans (and other group savings programs) use twelve monthly GEIAs cells inside one group contract underwritten by the insurance carrier. Each month, only one GEIA cell (GEIA account) in a GEIA contract would accept new contributions. Each GEIA bucket would last for twelve months, after which interest would be credited to the bucket and the principal sum plus interest credited "rolls" into the corresponding new cell/bucket for that month. For example, a January 2005 cell would be credited interest at the beginning of January 2006 and principal plus credited interest becomes the starting value for the January 2006 cell. To this amount, new contributions are added and withdrawals are subtracted. Each of these monthly GEIA cells would have unique participation rates, anniversary dates, crediting rates, cash flows (in and out), etc. The algorithm that follows is for one of these GEIAs cells and not for all 12 GEIA cells. Each GEIA cell, however, uses the same basic algorithm. The total Group EIA contract account balance for an individual participant is the sum of the account balances in the twelve GEIA cells outstanding at any one time. The record keeping, at the individual level, could be handled by the plan administrator (if properly coordinated with the carrier) or by the carrier (more likely). In an embodiment of the present invention, the algorithm is written to treat each monthly GEIA cell, such as January, February, etc., as a standalone GEIA contract. In an embodiment of the present invention, GEIA cells in positive positions do not subsidize those in poor positions. In another embodiment of the present invention, some GEIA cells may subsidize other cells.

An exemplary flow chart for implementing a Group Equity-Indexed Annuity contract with a guaranteed minimum participation rate for a plurality of participants is shown in FIG. 1. The method begins in step 100. In step 100, the status of the GEIA contract is determined. The status of the GEIA contract can be active or discontinued (i.e., inactive). In most cases, the contract is "active" and, therefore, the carrier accepts new contributions and processes withdrawals as required by the GEIA contract. The contract can be discontinued (i.e., no longer accepts contributions) if discontinued by the group savings program or the carrier. An active GEIA contract is one that is available to receive contributions. The GEIA values at the total group level and at the individual participant level are inherently interconnected. Indeed, neither value can exist without the other. A GEIA cannot operate without a plurality of participants.

In step 102, the interconnections between the group and individual account values are developed. In an embodiment of the present invention, participant account values are developed for each participant in the group. The carrier (or plan administrator) develops the account values. The development of a participant's account values is derived from the balance in each GEIA account (i.e., the balance in each of the 12 GEIA "cells") for the participant as shown in detail in FIG. 2. In an embodiment of the present invention, the development of a group's contract account values is derived from the balance in each GEIA account (i.e., the 12 "cells") for the plurality of participants in the group as shown in FIG. 3. The group's contract account values are used to derive data required for the calculation of participation rates, contract discontinuance value, and the like.

In step 104, total account balances are determined. In an embodiment of the present invention, the account balances that are determined include the individual account balance for each of the participants in the group and the group's total account balance. The carrier or the plan administrator can perform these calculations. In the FIG. 1 embodiment of the present invention, the account balance for each of the participants in the group and the group's total account balance are developed each month, but can be any interval specified by the GEIA contract. The account balance for a participant is the sum of each of the participant's GEIA balances in each monthly GEIA account. One having ordinary skill in the art will recognize that a GEIA account can be set up other than on a monthly basis, and can also be set up weekly, bi-monthly, quarterly and semi-annually, for example. The group total account balance is the sum of each participant's total account balance. The group total account balance is used to calculate various values including, but not limited to, participation rates.

Figure 2:
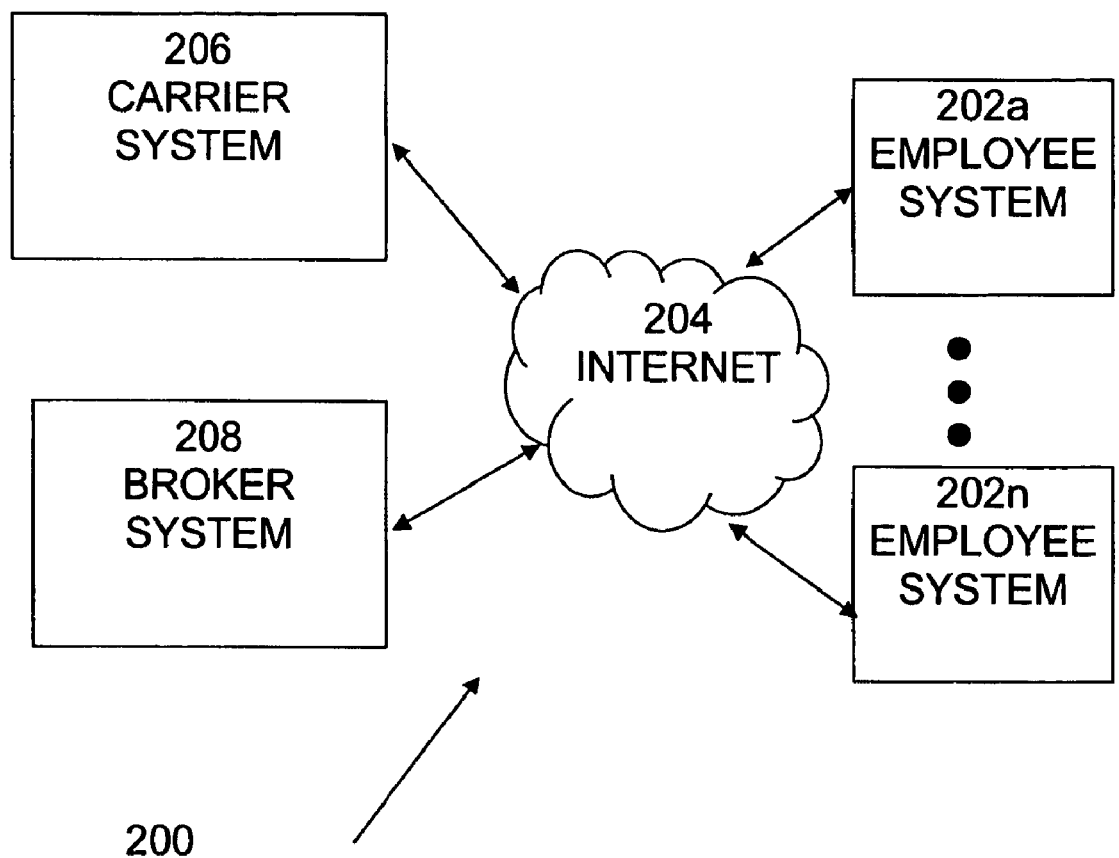
FIG. 2 depicts an exemplary flow chart of a method of developing participant account values according to an embodiment of the present invention.
Figure 3:
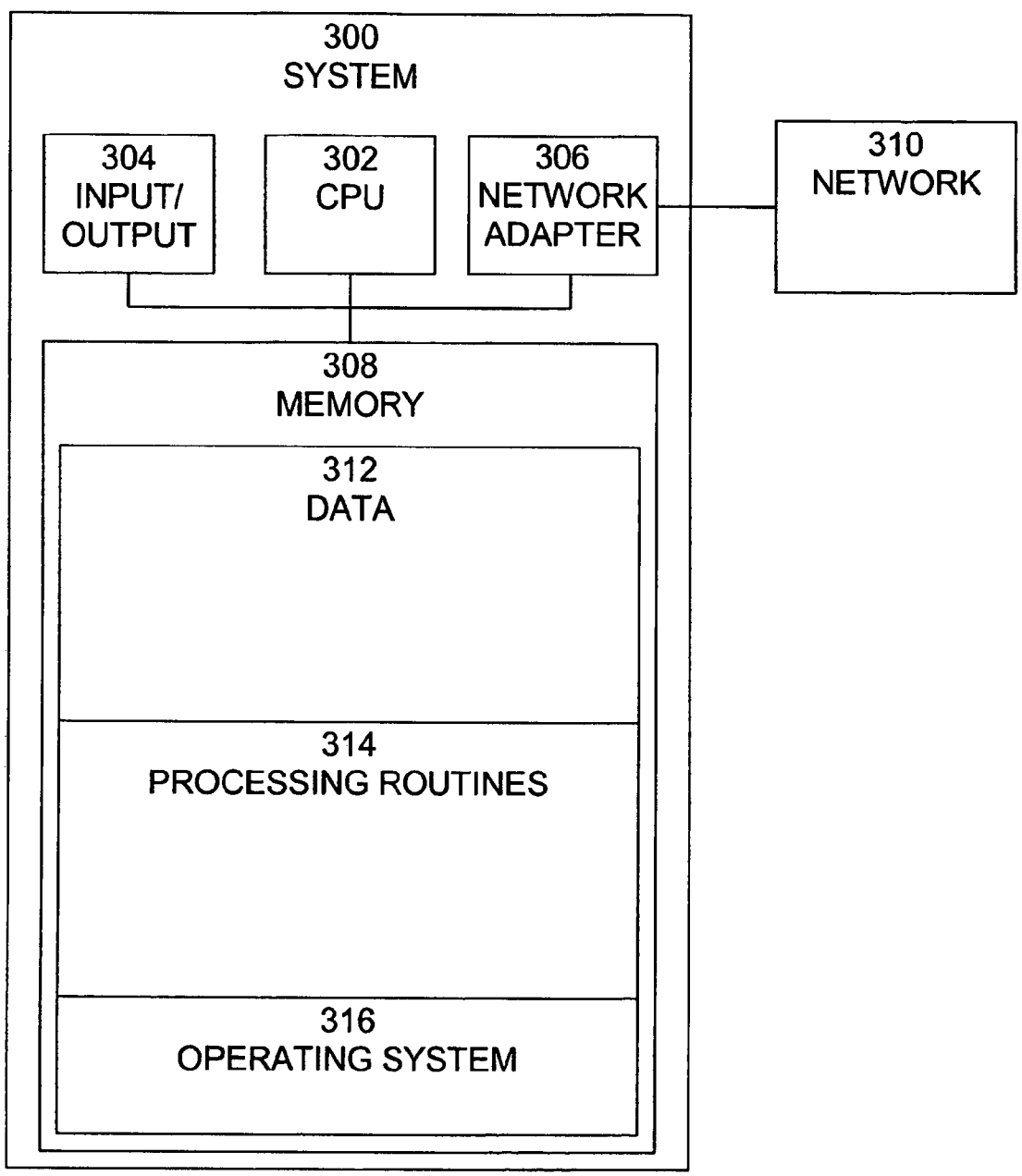
FIG. 3 depicts an exemplary flow chart of a method of developing group contract values to calculate participation rates according to an embodiment of the present invention.

An exemplary flow chart of a method of developing a participant account value for a GEIA account of a GEIA contract according to an embodiment of the present invention is shown in FIG. 2. In the FIG. 2 embodiment of the present invention, the participant account value is developed for each GEIA account of each participant in the group. Each GEIA contract includes a predetermined number of GEIA accounts that define when contributions are deposited into the contract. In the FIG. 2 embodiment of the present invention, a GEIA contract allows contributions to be deposited into the GEIA contract on the first of every month. In such a case, twelve accounts will exist for the GEIA contract and each participant in the group could have twelve GEIA accounts. In the FIG. 2 embodiment of the present invention, each of the GEIA accounts will have an anniversary date that is one year from the date that contributions are allowed to the respective GEIA account. One having ordinary skill in the art would recognize that the anniversary date can be any period of time specified by the GEIA contract, such as quarterly, semi-annually, and the like.

At step 200, data that identifies the participant is obtained from the participant or the plan administrator. In an embodiment of the present invention, the participant (or plan administrator) enters the identification data on an application form, or the like as required by the GEIA contract. In an embodiment of the present invention, the participant enters the identification data on an electronic form provided by a computer. The identification data can include, but is not limited to, participant name, participant address, participant social security number, employer, participant age, beneficiary name and address.

In step 202, it is determined if the GEIA Account is new (i.e., first time contributions are accepted to that Account). If so, the process proceeds to step 204. In step 204, the participant deposits an initial contribution into the GEIA account of the contract. In an embodiment of the present invention, a participation rate is communicated to the participant prior to the deposit of the initial contribution. At the time of the initial deposit, the participant's GEIA account value for the account corresponds to the amount of the contribution. After the initial deposit, the process proceeds to step 206.

In step 206, it is determined whether an anniversary date of the GEIA account has arrived. If so, the method proceeds to step 208. If not, the process proceeds to step 214. In step 206, account maintenance is performed to the participant's GEIA account value. Account maintenance includes, but is not limited to, obtaining a withdrawal request, if any, from the participant, depositing additional contributions (on each account anniversary) from the participant, crediting interest based on the participation rate and change in the equity index during the preceding year, and crediting bonus interest, if available.

In step 210, the index interest factor is calculated for the purpose of crediting interest. In the FIG. 2 embodiment of the present invention, the index interest factor is the participation rate calculated at the beginning of the previous year multiplied by the percentage increase in the equity index during the preceding anniversary year. In the FIG. 2 embodiment of the present invention, the index interest factor is not less than zero.

In step 212, the participant's account value for the GEIA account is calculated. The participants account value in the GEIA account is the prior account value plus the index interest and any applicable bonus interest less the amount of any withdrawal request and applicable withdrawal charges. Participants can make some withdrawals with no surrender charge ("free withdrawals"). These are limited to pre-defined amounts and/or events. All other withdrawals and transfers are subject to a maximum surrender charge on the amount taken in excess of the "free" withdrawals and transfers. The charge is designed to encourage a long-term commitment to the GEIA, and discourage market-timing behaviors. Withdrawals and transfers can be made throughout the year and on the GEIA account anniversary.

In step 214, the account balance is calculated reflecting withdrawals (which may be zero) from the GEIA account. In this case, the process proceeds to step 216. In step 216, applicable withdrawal charges are identified, if any. In step 218, the participant's account value is calculated. The account balance is the previous account value less any withdrawals and identified withdrawal fees.

An exemplary flow chart of a method of developing group contract account values to calculate participation rates according to an embodiment of the present invention is shown in FIG. 3. In the FIG. 3 embodiment of the present invention, the method begins in step 300. In step 300, data is collected. The data collected can include, but is not limited to, contributions by all participants (separately, and in total) to a GEIA account of the GEIA contract, yield for the predefined bond index, duration of bond index, the total return of the bond index for a previous month, the margin used to reflect bond risks and cost of minimum accumulation guarantees, the carrier fee and charge for transferring the minimum accumulation guarantees to the carrier, and data necessary to calculate the cost of call options on standard equity index, and the index return for the previous twelve month period.

In step 302, the participation rate for the GEIA account is set and communicated to participants. In the FIG. 3 embodiment of the present invention, the participation rate is set in accordance with an algorithm discussed in further detail herein below. In step 304, it is determined if t=0 (first time contributions are accepted to that GEIA Account). If so, the method proceeds to step 306. In step 306 data is collected. The data collected can include, but is not limited to, bond index yields, margin for risks, carrier fees, and data necessary to calculate cost of call options on the equity index. Note, if t=0, data regarding the market value of the bond index, and change in the standard equity index is not needed and therefore not collected. In step 308, the participation rate is calculated in accordance with the algorithm discussed in further detail herein below.

In step 312, available interest for the GEIA account/bucket (i.e., cell) is calculated. In the FIG. 3 embodiment of the present invention, the available interest is calculated in accordance with the algorithm discussed herein below. The available interest is calculated using a combination of old money and new money for the GEIA account. In step 314 data is collected. The data collected can include, but is not limited to, bond index yields, margin for bond risks and minimum accumulation guarantees, carrier fees, and data necessary to calculate cost of call options on standard equity index, and the payoff from the prior year's purchase of call options. Note, the data required includes the payoff amount on the prior year's call option since the payoff amount is another form of contribution that must be invested to track the performance of the bond index. In step 316, the participation rate is calculated in accordance with the algorithm discussed in further detail herein below.

In step 318, it is determined if the calculated participation rate is within the GEIA contract required range. If so, the process proceeds to step 320 where it ends and the participation rate is communicated to participants. If not, the process proceeds to step 322. In step 322, the carrier adjusts the participation rate to meet the required range. In an embodiment of the present invention, the participation rate is either increased to the minimum level, or decreased to the maximum level. An increase requires the insurer to deposit sufficient cash to purchase additional call options.

Figure 4:
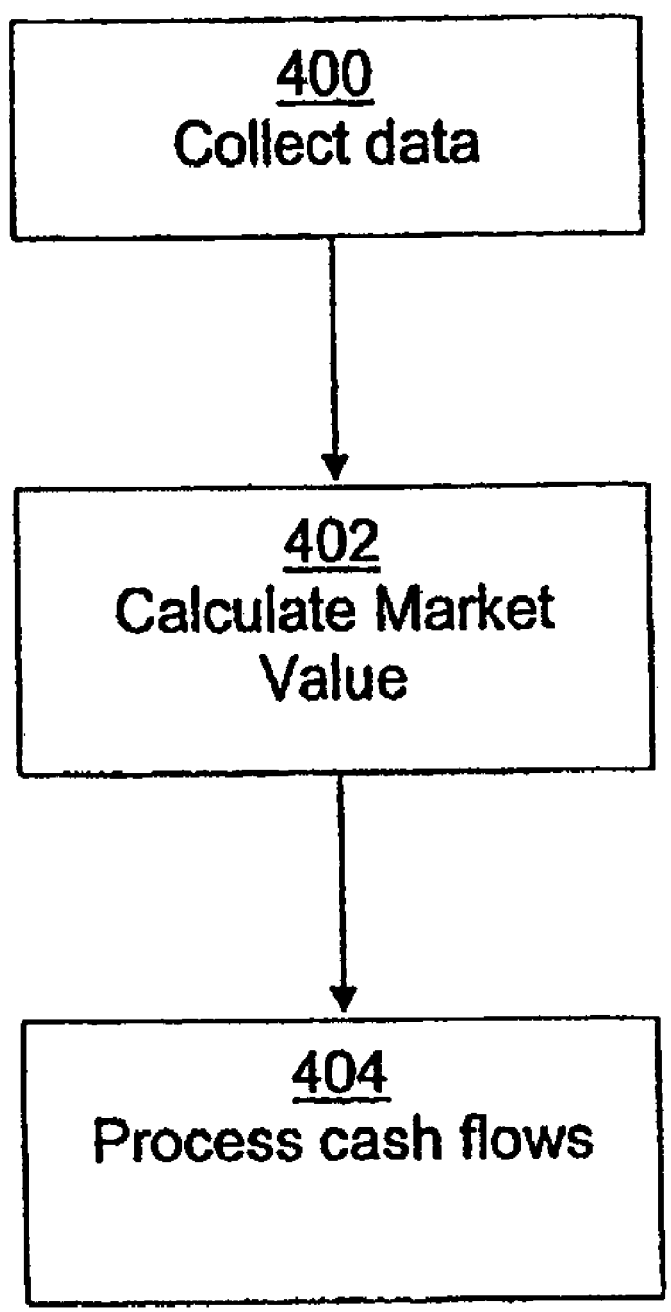
FIG. 4 depicts an exemplary flow chart of a method of developing contract market value according to an embodiment of the present invention.

An exemplary flow chart of a method of developing the group contract market value according to an embodiment of the present invention is shown in FIG. 4. In the FIG. 4 embodiment of the present invention, the GEIA contract's market value can be developed to determine the liquidation value of the GEIA contract, and to determine participation rates. The liquidation of the group contract includes immediate liquidation and slow liquidation. Immediate liquidation includes the payment of the GEIA contract's calculated market value (using the bond index values) and the transfer of GEIA account balances to a new carrier. In an embodiment of the present invention, slow liquidation includes the carrier fixing the available interest factor for n years when applying algorithm described later herein. In an embodiment of the present invention, slow liquidation includes application of algorithm and payment of GEIA account balances as they each reach their natural maturity, and the preclusion of new contributions.

The market value of the contract can be developed separately for each GEIA account of the GEIA contract. In the FIG. 4 embodiment of the present invention, the method begins in step 400. In step 400, data is collected. The data collected can include, but is not limited to, total contributions to the "open" GEIA, predefined bond index yields, duration of bond index, the total return of the bond index for a previous month, margin for bond risks, carrier fees, data necessary to calculate cost of call options on standard equity index, and payoff amount from previous call option purchases.

In step 402, the market value of Group EIA contract is calculated. In the FIG. 4 embodiment of the present invention, the contract market value is the previous market value plus the total return of the bond index for the month, new contributions, new payoffs from previous call options, and deposits from all sources less withdrawals, carrier fees, cost of call options for each anniversary year, and reimbursement to the carrier for any subsidized participation rates.

In step 404, cash flows are processed. Cash flows include deposits and withdrawals. In the FIG. 4 embodiment of the present invention, deposited cash flows include the deposit of contributions into one or more EIA accounts, call option payoffs, and adjustments by carrier (to support minimum participation rates and minimum accumulation guarantees). Deposit cash flow occurs on a monthly basis, such as the predefined period in a month when contributions can be deposited into a GEIA account. In an embodiment of the present invention, withdrawal cash flows include withdrawal for the cost of call options, carrier fees, amount of withdrawal requests, and reimbursements for carrier adjustments.

The present invention guarantees a minimum participation rate for the holding period (e.g., six years) of each GEIA account. The minimum participation rate is determined through negotiation. At the end of the holding period for the GEIA account the minimum participation rate can change. In an embodiment of the present invention, the participation rate may exceed 100%. In an embodiment of the present invention, participation rates are held within a corridor and may not exceed, say, 80%. The participation rate is calculated using a formula that is entirely independent of the carrier's money management performance. The experience from withdrawals, withdrawal charges, minimum accumulation guarantees, index volatility, and interest rate changes is reflected in future participation rates, as developed by the algorithm. The Algorithm develops values assuming contributions track results using a hypothetical investment portfolio (the bond index). These values are used to calculate the available interest for the hedge budget. The hedge budget is not dependent on the carrier's money management performance. The algorithm is illustrated in the Excel spreadsheet shown in FIGS. 7A-7D. FIGS. 7A-7D show what the GEIA would have produced using historical information for a GEIA started in 1985.

The algorithm described here makes some simplifying assumptions, largely for presentation purposes. Extensions and refinements, however, are fairly straightforward once the process is understood. We assume an annual ratchet GEIA and time periods, t, measured in years (but extensions to, say, monthly periods or to the "point-to-point" design are possible). The GEIA allows participants to make some withdrawals with no surrender charge. These are limited to pre-defined amounts and events, for example complete access at the end of the contribution "holding period" (effectively a maturity date). All other withdrawals (and transfers) are subject to a maximum surrender charge (say, 5%) on the amount withdrawn in excess of the "free" withdrawals (and transfers). The surrender charge should be high enough to discourage "market-timing" activity by participants, but not too excessive. A penalty of 5% (subject to SNFL maximums) should suffice in most GEIA contracts.

Withdrawals (and transfers) are permitted throughout the year, not just on the anniversary. Since a participant may have money in more than one GEIA account, all withdrawal requests (except "maturity" payments are handled on a "pro rata by individual" basis). The calculation is tedious, but fairly straightforward, and not illustrated here.

Interest credits are added to individual account balances on each anniversary. Withdrawals and transfers prior to the anniversary date from the GEIA account earn no interest credits for that year. This is another form of surrender charge and further acts to discourage "trading" activity (which over the long term could prove detrimental to the participants in the GEIA).

We also assume the carrier will deposit (and manage) contributions and withdrawals (i.e., cash flows) through an insulated separate account contract (see step 404). The assets in the separate account are not available to meet the carrier's other obligations. In an embodiment of the present invention, the market value of the separate account is below the market value of the group contract. Carrier's general account makes the separate account whole. In an embodiment of the present invention, the market value of the separate account is above the market value of the group contract. The excess value belongs to carrier's general account. The algorithm can operate exactly the same if the assets are managed as part of the carrier's general account.

The GEIA contract is non-participating in the investment results of the separate account. The investment performance of the assets will have no impact on participation rates. The GEIA contract, however, does participate, and fully absorbs, the effects cash flows (e.g., contributions, withdrawals) have on future participation rates. Therefore, the GEIA has both participating and non-participating features. The contract participates in the experience it generates (e.g., contributions, withdrawals) and does not participate in the experience it does not generate (e.g., the carrier's investment results on the cash flows). The GEIA contract can also offer the choice of operating the minimum accumulation guarantees on a par or non-par basis. In the non-par design, the carrier would collect an extra fee or margin and if the minimum guaranteed value is higher than the participant account balance, the insurer's general account reimburses the difference. One having ordinary skill in the art would recognize that the contract can also operate on a participating basis.

The experience (positive or negative, as calculated by the algorithm) from withdrawals, withdrawal charges, index volatility, and interest rate changes is reflected in future participation rates, as developed by the algorithm. These experience elements will neither benefit nor hurt the carrier.

The GEIA contract receives initial contributions at time t=0 (GEIA cell start date) equal to $C_0$. (This is the total of contributions from all individuals allocating funds to that GEIA account at t=0.)

The carrier charges a fee, $f_n$ (in basis points), times the beginning of the month account value. (The algorithm assumes the fee is deducted at the end of the month from the assets in the separate account. Other methods are possible. In any case, it is not deducted from the account value; it is merely calculated using the account value as the multiplier.)

The participation rate algorithm at the initial contribution is:

$$AV_0=C_0, R_1=(y_0-f_0)/\{(1+y_0-f_0)*O_0\}, A_0=C_0-R_1*O_0*C_0 \quad \text{Alg (1)}$$

In Alg (1), "t" represents time, measured from GEIA inception or the time when funds are first received. The GEIA begins when the first set of funds are received at time t=0. The first such annual anniversary or the end of the specified interval is represented by t=1. This labeling continues ad infinitum. (Note, we have twelve EIAs each with their unique time t=0, 1, 2, etc.). "$C_t$" represents the total participant contributions made at time t, where t=0, 1, 2, ... corresponds to the specific time when contributions can be made to the GEIA account. Let "$y_t$" represent the yield-to-maturity of the bond index measured at time t. In an embodiment of the present invention, the yield-to-maturity is adjusted by a margin to budget for the risk of bond calls and the risk of defaults, as well as the cost of the minimum accumulation guarantee. Note, the minimum guarantee can be absorbed through the hedge budget or simply transferred to the insurer for a price. Let "$AV_t$" represent the sum of the individual account values at time t.

"$A_t$" represents the contractual market value of the assets used to back the individual account balances guaranteed by the carrier. For our purpose, the contractual assets will be replicated using the value of a long-duration bond index, like the Lehman long corporate bond index. By using an external bond index, the participants are guaranteed the returns from the bond index and the carrier, in effect, guarantees "average" money management performance. Let $F_n$ represent the fee withdrawn from the assets at time n. The charge equals $f_n*AV_n$ and is deducted from the contractual assets, $A_n$. The dollar-weighted rate of return attributable to $F_n$, collected throughout the year, is denoted by r. Let "$r_t$" represent the total rate of return of the bond index from time t−1 to t, one full account year. In Alg (1), $R_1$ (the participation rate) must exceed m %, but never more than m*%, where m % and m*% represent the minimum and maximum permissible participation rates. When $R_1$ does not exceed m % the carrier adds cash to bring the participation rate to m %. In such cases, the carrier is reimbursed as soon as subsequent resets produce participation rates in excess of the minimum, m %.

Let "$O_t$" represent the percentage cost of one-year call options on a standard equity index at time t. In the FIG. 1 embodiment of the present invention, the standard equity index is the S&P 500 without dividends. The cost is derived using publicly available information regarding the one-year risk-free rate, the volatility of the index, and the index dividend return. Like the contract asset values, the cost of the call options is derived by formula, and kept outside the carrier's control or discretion.

The participation rate algorithm for times after the initial contribution is:

$$AV_t = (AV_{t-1} - \Sigma fW - \Sigma cW - \Sigma sW)*(1+RI_t) + C_t \text{ (summations from } t-1 \leq n < t)$$

Where $RI_t = \text{Max}(0, (S_t/S_{t-1}-1)*R_{t-1})$

In Alg (2), "$fW_n$" represents the total withdrawals made with no surrender charge made at time n, where "n" can be any time during the year. In an embodiment of the present invention, n runs from the beginning of year "t" to the end of that year, such that $t < n \leq t+1$. Let "$cW_n$" represent the total "chargeable" withdrawals made at time n, where n runs from the beginning of year "t" to the end of that year, such that $t < n \leq t+1$. Let "$sW_n$" represent the total surrender charges collected on chargeable withdrawals at time n. Let "$A'_t$" represent the contractual market value of the GEIA assets after the contributions at time t and after the payoff from call options purchased in the prior year. Let "$D_t$" represent the duration of the bond index measured at time t. Let "$r'_t$" represent the dollar-weighted total rate of return associated with the "free" withdrawals. Let "$r''_t$" represent the dollar-weighted total rate of return associated with the chargeable withdrawals and the collected surrender charges. Let "$S_t$" represent the value of the standard equity index without dividends at time t. Let "$J_t$" represent the amount of interest available from the security portfolio to buy one-year call options on the standard equity index at time t. Let "$I_t$" represent the conversion from market yields to "smoothed" or "blended" yields available over the duration, $D_t$, of the bond index used to derive the contract asset values, $A_t$. Let "$P_t$" represent the payoff at time t from the call options purchased at time t–1.

Alg (2) is an iterative process that is applied from t=1, 2, 3 . . . n. To determine, $R_t$, the participation rate, $I_t$ is calculated using the following:

$$AV_t(1+I_t)^{D_t} = A'_t(1+y_t-f_t)^{D_t} \quad \text{Equ (1)}$$

Then, $J_t$ is calculated using the following:

$$J_t = AV_t * I_t / (1+I_t) \quad \text{Equ (2)}$$

Then, $R_{t+1}$ is calculated using the following:

$$R_{t+1} = J_t / O_1 \quad \text{Equ (3)}$$

From this we derive $A_t = A'_t - R_{t+1} * O_t * AV_t$ \quad Equ (4)

Again, the R is subject to constraint limits (m % and m* %). If R should exceed m* %, then the factor $J_t$ will be reduced to bring R to m* %. The excess will be available as a "bonus" credited currently, in addition to interest credits based on the prior year's participation rate. If R falls below m %, the carrier kicks in enough money to buy sufficient options to bring R to m %. This "subsidy" is repaid as soon as practicable and the amount repaid is deducted from the contractual market value of assets in the GEIA.

Fees are deducted from the insulated separate account and the deduction is also reflected in the contractual market value of assets in the GEIA (as derived using the bond index). Fees can also be negotiated & subject to a "most favored nation" clause. In an embodiment of the present invention, a participant will have the option to keep the contributions in the GEIA if terminated from the employer. In an embodiment of the present invention, the carrier will issue an individual certificate to the participant that preserves the participant's benefits and guarantees.

In an embodiment of the present invention, if the plan sponsor (or carrier) wishes to terminate the arrangement, the liquidation basis is to transfer cash at the contractual market value of assets and also transfer liabilities (equal to the total individual account values). These assets and liabilities would be transferred to a new carrier. At the sponsor's option, as an alternative to this market value liquidation, the carrier may calculate a fixed "available interest" factor I to be used in determining participation rates over the next n (e.g., six) years. As GEIA account balances reach their natural "maturity", the carrier pays the maturity values then falling due (which are then available for participants to reinvest in other plan options). In n (e.g., six) years time, the last maturity payment is made and the contract is fully liquidated.

In an embodiment of the present invention, since all necessary information (e.g., cash flows, index prices) is never instantaneously available as assumed in the Algorithm, carriers will need to adopt certain protocols for operating the new GEIA including the carrier can set the participation rate n days in advance (based on then actual index prices and estimated cash flows) and as the carrier did before, but communicate the participation rate as an estimate. Then, x days later, once actual information is available, the actual participation rate is calculated and communicated. The carrier can either absorb the risk/reward associated with this method (i.e., n days of slippage) or can transfer the risk/reward back to the GEIA. In the later case, the following year's participation rate would reflect the risk/reward associated with the prior estimated participation rate.

Logical product extensions are contemplated by the present invention, While the algorithm assumes all asset prices are pegged to outside reference indices, it is possible to replace the indices with the actual values delivered using an actively managed bond portfolio strategy. Similarly, while the algorithm is used as part of a bundled product solution inside an annuity contract, it is obvious that the structure can be "unbundled" and repackaged to achieve comparable values. The algorithm is presented using recognized indices. It is, of course, possible to use different indices (or combinations of different indices). This could be done with both the bond index and the equity index. Therefore, participation rates could use the same algorithm but with values derived from, say, 50% of the Wilshire 5000 index and 50% of the S&P 500 index. The number of possible combinations and permutations is, in fact, virtually infinite. Applications to small group savings programs are equally possible (both qualified and non-qualified programs like 403(b), 457, 401, 529, and deferred compensation plans). It is also possible to extend the concept to association savings programs and, in fact, any logical "group" of individuals. In this case, a collection of small plans (or individuals) would combine their cash flows and be treated as a commingled arrangement. Now, each plan (or individual) would enjoy the benefits of the same participation rate achieved through the aggregation (without the need to absorb the cash flow uncertainties associated with small (or individual) savings programs). In addition, it is possible to modify the design by purchasing "out-of-the-money" equity options with the available interest. In this case, the carrier's interest credits would equal all remaining available interest (i.e., the amount not spent on "out-of-the-money" call options) plus the payoff from the options. It should be equally obvious that the new GEIA does not need to be operated using 12 cells/buckets. It, in fact, can operate with any number of cells (including daily). Such product extensions are obvious and claimed as part of the present invention.

Figure 5:
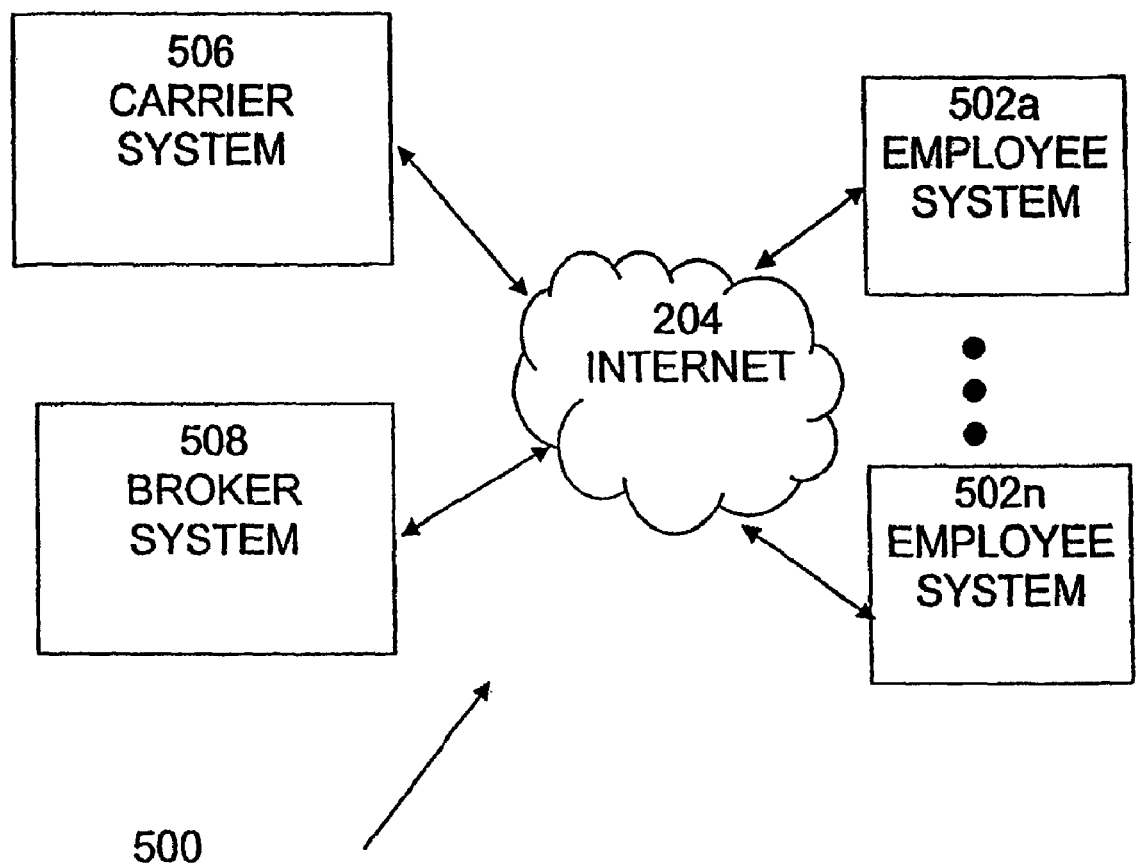
FIG. 5 depicts an exemplary block diagram of a system in which the present invention can find application.

An exemplary block diagram of a system in which the present invention can find application is shown in FIG. 5. In the FIG. 5 embodiment, system 200 includes a plurality of systems 502a-502n. The systems 502a-502n may be personal computer systems operated by employees of an employer sponsoring ("sponsor") a self directed group savings plan and GEIA plan administrator. Systems 502a-502n are communicatively coupled to a data communications network, such as the Internet 504. Systems 502a-502n allow users to perform transactions over Internet 504 to system 506 including, but not limited to, providing contributions to a GEIA, withdrawing funds from a GEIA, and transferring funds to and from a GEIA. Requests for information are generally generated by browser software running on user systems 502a-502n in response to an event, such as input from users. Requested transactions are received and processed by system 506. Responses are transmitted from system 206 to the user systems 502a-102n in accordance with the processed request.

In the FIG. 5 embodiment, Broker system 508 is communicatively connected to system 506 and receives requests to purchase a set of securities and calls relating to the requests for transactions received by system 206 from the user systems 502a-502n. System 508 processes the received purchase requests and transmits a response in accordance with the request.

Figure 6:
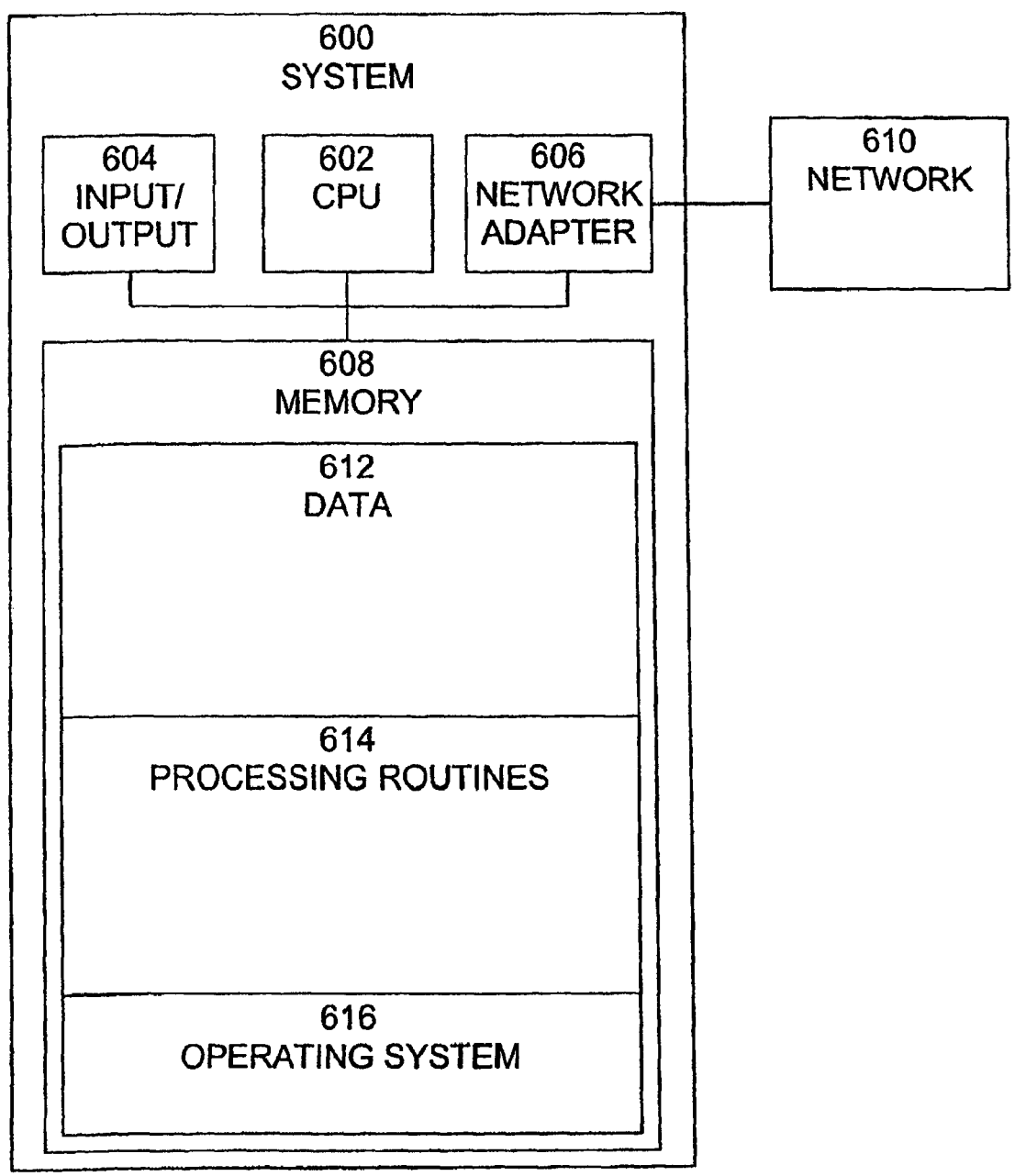
FIG. 6 depicts an exemplary block diagram of a system of FIG. 5 in which the present invention can find application.

An exemplary block diagram of a system of FIG. 5 is shown in FIG. 6. In the FIG. 6 embodiment of the present invention system 600 can be any one of systems 502a-502n, 506 and 508 shown in FIG. 6. System 600 is typically a programmed general-purpose computer system, such as a personal computer, workstation, and minicomputer or mainframe computer. System 600 includes processor (CPU) 302, input/output circuitry 604, network adapter 606, and memory 608. CPU 602 executes program instructions in order to carry out the functions of a system 602, 506, or 508 in accordance with the present invention. Typically, CPU 602 is a microprocessor, such as an INTEL PENTIUM® processor, but may also be a minicomputer or mainframe computer processor. Input/output circuitry 604 provides the capability to input data to, or output data from, system 600. For example, input/output circuitry may include input devices, such as keyboards, mice, touchpads, trackballs, scanners, etc., output devices, such as video adapters, monitors, printers, etc., and input/output devices, such as, modems, etc. Network adapter 306 interfaces system 600 with network 610. Network 610 may be any standard local area network (LAN) or wide area network (WAN), such as Ethernet, Token Ring, the Internet, or a private or proprietary LAN/WAN.

Memory 608 stores program instructions that are executed by, and data that are used and processed by, CPU 602 to perform the data mining functions of the present invention. Memory 608 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

Memory 608 includes data 612, processing routines 614, operating system 616, data structure 618 and notification routine 620. Data 612 includes data used by the present invention. Processing routines 614 are routines that implement the functions of the present invention. Operating system 616 provides overall system functionality.

FIGS. 7A-7D show what the GEIA would have produced using historical information for a GEIA started in 1985.

While specific embodiments of the present invention have been illustrated and described, it will be understood by those having ordinary skill in the art that changes can be made to those embodiments without departing from the spirit and scope of the invention.

Appendix

An analysis of the interest that historically might have been credited on the group equity-indexed annuity (GEIA) that is to be offered to participants in employer sponsored retirement plans. The issue is approached by comparing the potential GEIA returns with potential crediting on a 5-year Stable Value Fund and S&P 500 Total Returns. The results of that comparison are shown below and the methodology for the comparison is then described.

|  | 1-year | | | 3-year | | | 5-year | | | 10-year | | |
|---|---|---|---|---|---|---|---|---|---|---|---|---|
|  | Worst | Avg. | Best | Worst | Avg. | Best | Worst | Avg. | Best | Worst | Avg. | Best |
| Average Annual Returns on Other Measures when EIA Hits a Specified Level | | | | | | | | | | | | |
| EIA | 0.0% | 9.8% | 44.0% | 0.0% | 11.0% | 36.8% | 1.6% | 11.5% | 30.9% | 2.9% | 12.1% | 18.6% |
| Stable Value | 5.9% | 8.7% | 12.6% | 6.5% | 8.9% | 13.1% | 7.8% | 9.1% | 13.0% | 7.4% | 9.5% | 11.6% |
| (range) | 11.6% | | | 7.7% | | | | | | | | |
| S&P Tot. Rtn. | −38.8% | 12.1% | 61.2% | −16.1% | 12.3% | 33.3% | 1.5% | 13.0% | 29.6% | 4.2% | 13.8% | 19.2% |
| (range) | 3.2% | | | −2.7% | | | | | | | | |
| Range of Average Annual Returns on All Measures | | | | | | | | | | | | |
| EIA | 0.0% | 9.8% | 44.0% | 0.0% | 11.0% | 36.8% | 1.6% | 11.5% | 30.9% | 2.9% | 12.1% | 18.6% |
| Stable Value | 5.3% | 8.7% | 13.7% | 5.9% | 8.9% | 13.5% | 6.2% | 9.1% | 13.1% | 6.6% | 9.5% | 11.9% |
| S&P Tot. Rtn. | −38.8% | 12.1% | 61.2% | −16.1% | 12.3% | 33.3% | −3.8% | 13.0% | 29.6% | 2.9% | 13.8% | 19.5% |

Basis of Calculation

Equity-Indexed Annuity

It was assumed that the EIA was a mature product in the plan and that contributions to the product had been made in all years leading up to the period being evaluated.

The interest is determined as a "participation rate" times the percentage change in the S&P 500 Index without dividends, plus a yearend bonus. The participation rate is limited to 80% and any additional available value is credited as a bonus at the end of the year.

The "available value" to provide index-based benefits is earnings on the supporting bond portfolio minus the insurer's operating margin (assumed to be 1.20%), plus any withdrawal charges assessed against transfers and terminations prior to the end of the year.

All participants entering a one-year interest-crediting period receive the same participation rate and bonus, regardless of when they made their contribution to the GEIA.

The earnings on the supporting bond portfolio reflected equal monthly investments in 7-year bonds over the 84-month period leading up to the year of crediting index-based interest. The investments were assumed to be 50% A Corporate and 50% BBB Corporate.

Stable Value Fund

The credited interest in the stable value fund is earnings on the supporting bond portfolio minus an operating margin (assumed to be 1.20%).

The earnings on the supporting bond portfolio reflected equal monthly investments in 5-year bonds over the 60-month period leading up to the month of crediting interest. The investments were assumed to be 50% A Corporate and 50% BBB Corporate.

S&P 500 Total Return

The annual return is the compound monthly return including dividends. This is different from the S&P returns without dividends that are typically reported on television, radio, and newspaper news reports.

Interpretation

The comparisons were prepared on the basis of available historical data for S&P 500 monthly closing amounts, S&P 500 monthly total returns, S&P 500 annualized dividends, historic index volatility derived from daily S&P 500 levels, 1-year LIBOR rates, CMT Treasury yields, and maturity-specific spreads of A and BBB corporate bonds over commensurate Treasury returns. Some data were unavailable for early periods and approximations were made, where necessary. These include (a) S&P 500 dividend prior to 1974, assumed to be 4%, (b) S&P total return prior to 1974, derived from S&P 500 without dividends plus the assumed dividend, (c) LIBOR prior to September 1989, assumed to be 1-year Treasury plus 0.40%, and (d) maturity-specific spreads of corporate bonds over Treasuries prior to 1985, assumed at the average level since 1984. The approximations should cause little distortion because they are based on relevant historical data and because they often had a parallel impact on the items being compared.

The comparisons are based upon the assumption of equal amounts being invested at the prevailing investment yields over a multi-year period. In reality, amounts invested will vary based upon the amount of contributions, the amount of interest credited and retained, and the amount of withdrawals. Insofar as the same assumption of level contributions was assumed for each product, no bias was introduced into the comparison.

The first table shows the hypothetical historical returns for the 5-year Stable Value fund and the S&P 500 Total Return for the identical period for which the GEIA interest was calculated. This profiles the difference in results if a participant had made different choices at a specific time. Because there are a number of occurrences in which the GEIA credited no interest over a 1-year period or a 3-year period, the ranges of comparable results for these occurrences for the Stable Value fund and the S&P 500 Total Return are shown.

The second table shows the full range of results from worst to best for all three investment allocations without regard to correlating the timing of their occurrence. This provides some measure of the relative volatility of the returns under the various allocations.

Both tables contain the average annual results, which reflect the long-term return differences that could occur if historical patterns were to repeat themselves.

The differences between the GEIA interest and the Stable Value fund interest are heavily influenced by two phenomena—(a) the GEIA value is based upon the yield on seven-year investments while the Stable Value fund is based on five-year investments, which creates additional yield under most circumstances and (b) interest based on index changes reflects any overperformance of the index over a risk-free interest rate, and the period analyzed contained such historic overperformance.

What we claim is:

1. A system for a group equity index savings contract, comprising:
 a computer for documenting and maintaining the contract, including:
 a first benchmark fixed income investment index;
 a second benchmark equity investment index;
 a third benchmark index on a price of calls on the second benchmark equity investment index;
 a definition of deposits, withdrawals and investment credits, including timing parameters, fixed and other non-discretionary fee parameters, participation rate and associated constraints and parameters, and liquidation parameters;
 a definition of an eligible group of participants;
 a definition of investment cells and associated time periods for each cell;
 a definition of blending parameters defining anticipated interest and actual interest, such blending relating to an economic value of deposits in different investment cells;
 a definition of guarantees relating to minimum interest credits to investment cells and participants in such cells; and
 wherein the computer is configured to execute:
 a formula for determining the anticipated interest for each cell and each participant in the cell, and actual interest to be credited to each cell for each participant, which does not allow for discretionary input, and which is based solely on the benchmarks, the fees, the participation rate definition and parameters, deposits, withdrawals, blending parameters, and the guarantee and wherein the determined anticipated interest cannot be negative and wherein the anticipated interest is expressed as a participation rate relating to the increase in the second benchmark equity investment index over a specified period of time and wherein the interest is due as of a specified date.

2. The system according to claim 1, wherein the participation rate is constrained to not be below a stated minimum.

3. The system according to claim 1, wherein the participation rate is constrained to not be above a stated maximum.

4. The system according to claim 1, wherein the participation rate is constrained to not be below a stated minimum or above a stated maximum.

5. The system according to claim 1, wherein the participation rate is constrained to not be below a stated minimum and is capped.

6. The system according to claim 1, wherein the non-discretionary formula is defined to accrue interest over at least one time period that becomes subject to the guarantee at the end of each of the time periods.

7. The system according to claim 6, wherein the time period is one of a year and a month.

8. The system according to claim 6, wherein the benchmarks are each fixed at their current stated value at the beginning of each time period and remain in effect for the time period.

9. The system according to claim 1, wherein the liquidation parameters include withdrawal and termination parameters.

10. The system according to claim 1, further comprising:
a definition of participants' rights relating to deposits, withdrawals, interest credits, disclosure and notice, including an obligation to return to a participant all deposits actually made and all credited interest upon withdrawal.

11. The system according to claim 1, further comprising:
a definition of group contract holder rights, including rights to terminate the contract and rights upon such termination.

12. A method of implementing a group equity index savings contract, comprising:
specifying in a memory of a computer:
a first benchmark fixed income investment index;
a second benchmark equity investment index;
a third benchmark index on a price of calls on the second benchmark equity investment index;
a definition of deposits, withdrawals and investment credits, including timing parameters, fixed and other non-discretionary fee parameters, participation rate and associated constraints and parameters, and liquidation parameters;
a definition of an eligible group of participants;
a definition of investment cells and associated time periods for each cell;
a definition of blending parameters defining anticipated interest and actual interest, such blending relating to an economic value of deposits in different investment cells;
a definition of guarantees relating to minimum interest credits to investment cells and participants in such cells; and
using a processor to:
execute a non-discretionary formula for determining the anticipated interest for each cell and each participant in the cell, and actual interest to be credited to each cell for each participant, which does not allow for discretionary input, and which is based solely on the benchmarks, the fees, the participation rate definition and parameters, deposits, withdrawals, blending parameters, and the guarantee and wherein the determined anticipated interest cannot be negative and wherein the anticipated interest is expressed as a participation rate relating to the increase in the second benchmark equity investment index over a specified period of time and wherein the interest is due as of a specified date; and
credit the actual interest to each participant in each cell according to the formula.

13. The method according to claim 12, wherein the participation rate is constrained to not be below a stated minimum.

14. The method according to claim 12, wherein the participation rate is constrained to not be above a stated maximum.

15. The method according to claim 12, wherein the participation rate is constrained to not be below a stated minimum or above a stated maximum.

16. The method according to claim 12, wherein the participation rate is constrained to not be below a stated minimum and is capped.

17. The method according to claim 12, wherein the non-discretionary formula is defined to accrue interest over at least one time period that becomes subject to the guarantee at the end of each of the time periods.

18. The method according to claim 17, wherein the time period is one of a year and a month.

19. The method according to claim 17, wherein the benchmarks are each fixed at their current stated value at the beginning of each time period and remain in effect for the time period.

20. The method according to claim 12, wherein the liquidation parameters include withdrawal and termination parameters.

21. The method according to claim 12, further comprising:
a definition of participants' rights relating to deposits, withdrawals, interest credits, disclosure and notice, including an obligation to return to a participant all deposits actually made and all credited interest upon withdrawal.

22. The method according to claim 12, further comprising:
a definition of group contract holder rights, including rights to terminate the contract and rights upon such termination.

* * * * *